Figures 3, 4:
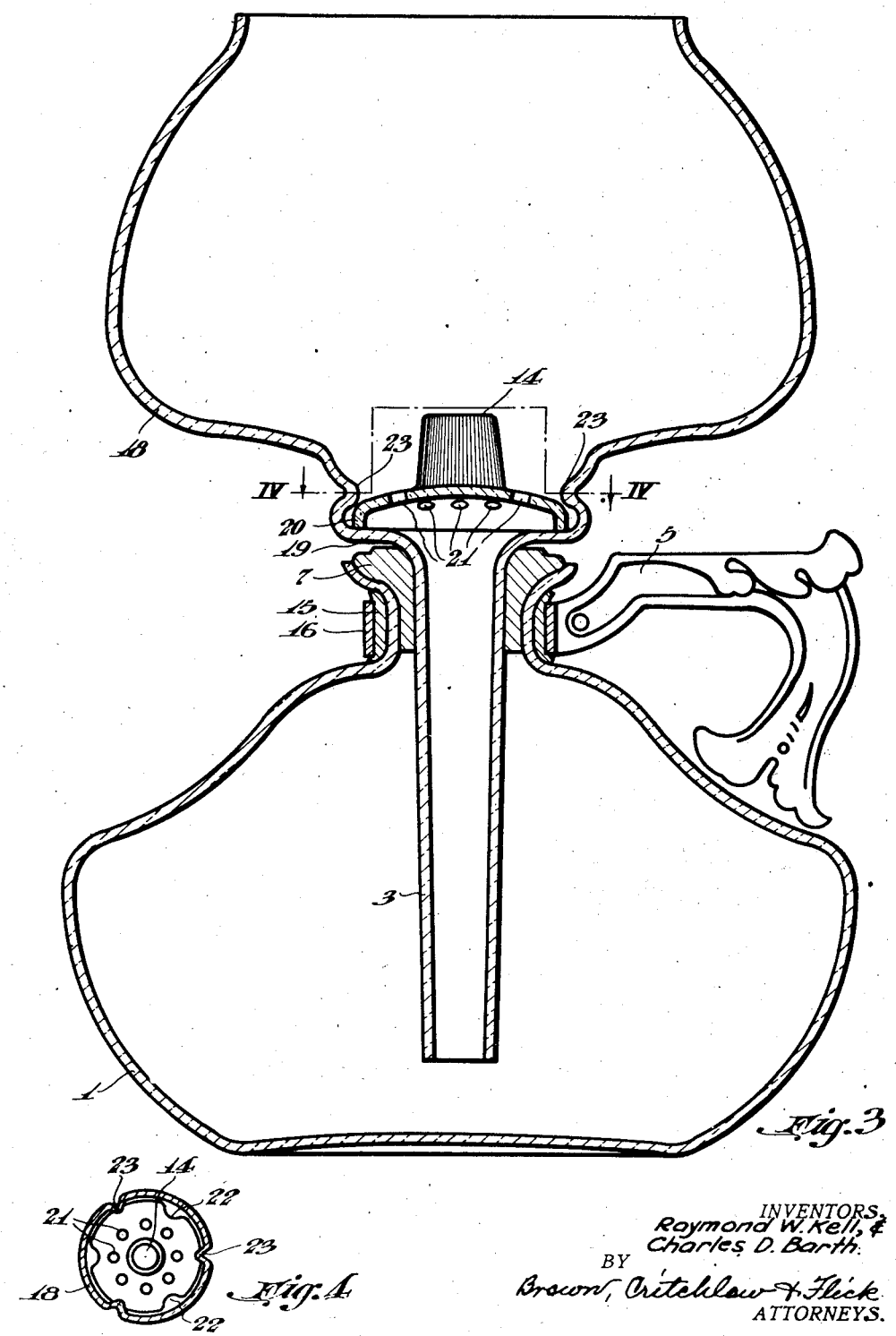

Oct. 17, 1933.  R. W. KELL ET AL  1,931,076
COFFEE MAKER
Filed Nov. 17, 1932   2 Sheets—Sheet 1
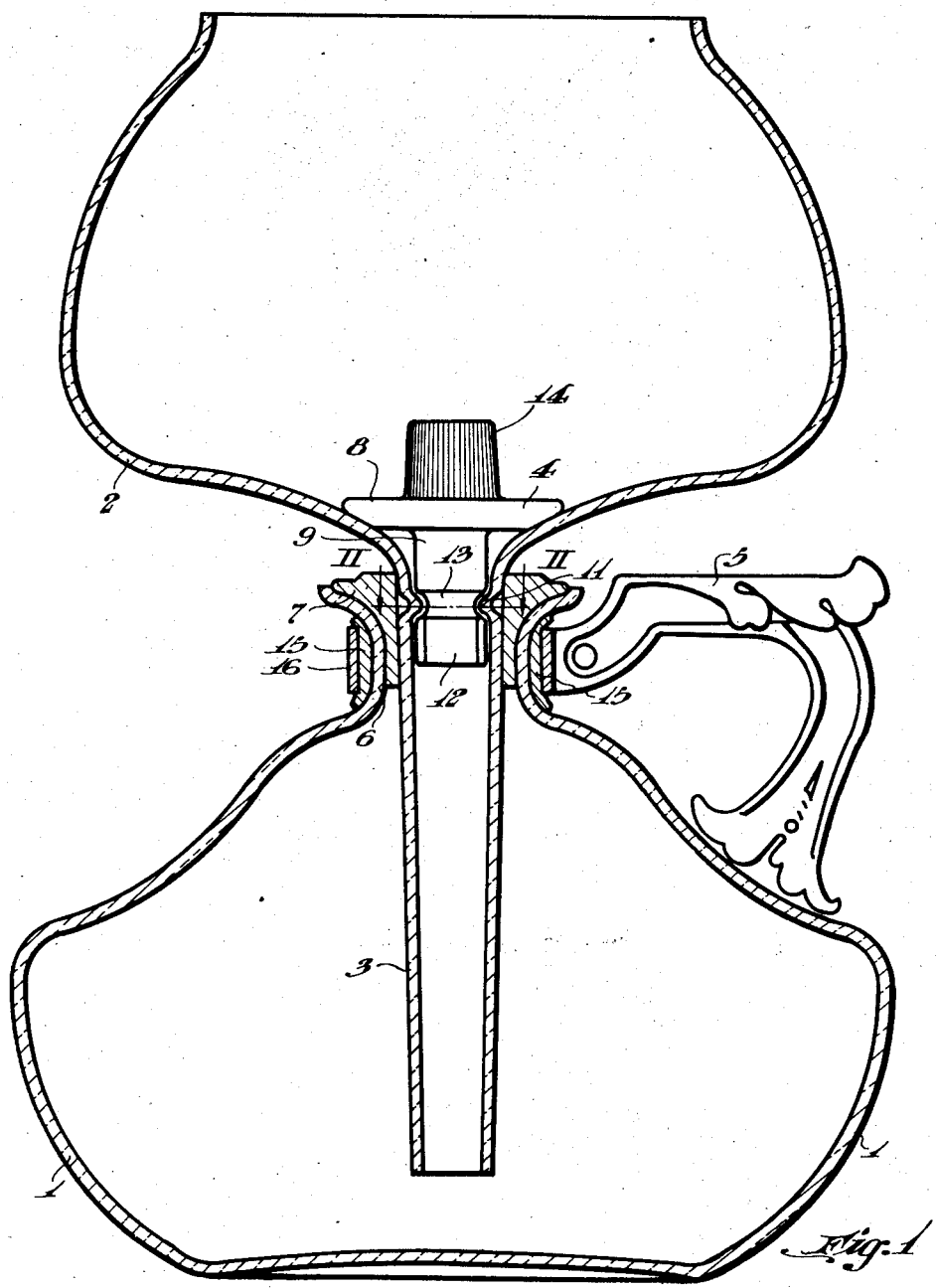
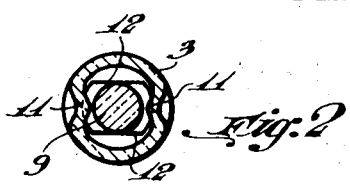
INVENTORS.
Raymond W. Kell, &
Charles D. Barth.
BY
Brown, Critchlow & Flick
ATTORNEYS.

Oct. 17, 1933.    R. W. KELL ET AL    1,931,076
COFFEE MAKER
Filed Nov. 17, 1932    2 Sheets-Sheet 2

INVENTORS,
Raymond W. Kell, &
Charles D. Barth.
BY
Brown, Critchlow & Flick
ATTORNEYS.

Patented Oct. 17, 1933

1,931,076

UNITED STATES PATENT OFFICE 1,931,076

COFFEE MAKER

Raymond W. Kell and Charles D. Barth, Charleroi, Pa., assignors to Macbeth-Evans Glass Company, Charleroi, Pa., a corporation of Pennsylvania Application November 17, 1932
Serial No. 643,061

5 Claims. (Cl. 53—3)

Our invention relates to coffee makers, and particularly to coffee makers of the so-called vacuum type in which liquid is caused to flow automatically by pressure or vacuum from one container to another.

The subject-matter of the present application is closely related to and is a modification of that of our copending application Serial No. 643,060, filed November 17, 1932.

It has been proposed heretofore to provide coffee makers of the same general type as that of the present invention, but the devices of the prior art have had certain disadvantages that are avoided in the coffee maker of our invention. For example, certain coffee makers that have been proposed have required the employment of straining devices of fabric that must be replaced at frequent intervals and which when used must be either discarded or washed and dried between successive uses thereof.

Other coffee makers have included metal parts with which the liquid coffee is in contact while at a relatively high temperature. The coffee reacts chemically with the metal surfaces of such parts and the result is to impart a taste or flavor to the coffee that is foreign to the natural taste of coffee. In addition, the salts produced by such chemical reactions may be somewhat disagreeable or possibly even slightly harmful in the case of certain metals, such as brass or copper.

In accordance with the present invention we provide a coffee maker all of the interior parts of which are non-metallic and preferably of glass or other suitable ceramic or refractory material that is inert with respect to the chemical constituents of coffee and which does not impart an unnatural taste thereto. Furthermore, the coffee maker of our invention comprises such relatively few and simple parts that uniformly excellent coffee may be made even by those of little skill in the art of making coffee. Also, the construction of the coffee maker is such that it may be easily and conveniently assembled and disassembled for cleaning or sterilizing of the surfaces in contact with the coffee.

The details of our invention will be described in connection with the accompanying drawings in which Fig. 1 is a view in central vertical section of a preferred form of coffee maker; Fig. 2 a view in transverse section taken on line II—II of Fig. 1; Fig. 3 a view similar to Fig. 1 of a modification; and Fig. 4 a view in transverse section taken on line IV—IV of Fig. 3.

Referring to Figs. 1 and 2 the coffee maker of our invention comprises a lower container 1, an upper container 2 having an integral tube 3 extending into the lower container 1, a closure member 4, and a handle 5.

The lower container 1, which is preferably of glass, is provided at its top with a relatively small neck portion 6 that flares outwardly at the top to constitute a member of funnel shape whereby the container may be conveniently filled with water or coffee poured therefrom.

The upper container 2 is also preferably of glass and it may be open at its top. The tube 3 is provided adjacent to its upper end with a sleeve or gasket 7 that is of rubber or other suitable flexible or resilient material which when inserted within the neck portion 6 of the lower container hermetically seals the connection between the containers 1 and 2. The tube 3 is of such length as to extend a short distance above the bottom of the lower container 1, this distance regulating the level of the water remaining in the lower container during the operation of the coffee maker.

The closure member 4, which is of glass and constitutes a valve for the opening through the tube 3, comprises a disc 8 having a slightly tapered bottom surface which rests upon the portion of the upper container 2 surrounding the opening in tube 3 and having depending therefrom a rod 9 that extends downwardly into the tube 3. The walls of the tube 3 are provided with integral projections or "nibs" 11 that cooperate with vertical flat sides 12 and a circumferential groove 13 in the rod 9 to provide a bayonet joint connection between the closure member 4 and the tube 3. This connection is sufficiently loose that the closure member 4 may move upwardly to permit the upward flow of liquid through the tube 3. The bottom surfaces of the disc 8 have a slightly imperfect fit with the adjacent walls of the container 2, and accordingly liquid may be drawn downwardly between these surfaces at a relatively slow rate, as will be later described.

The top of the closure member 4 is provided with a central knurled projection 14 which serves as a handle by means of which the closure member 4 may be rotated and lifted for the purpose of removing it or by means of which it may be inserted in its illustrated position.

The neck portion 6 of the lower container 1 is provided with a sleeve 15 that is of rubber or other suitable resilient and heat insulating material and which is gripped by a hinged clamping ring 16 of the handle 5. The handle 5 may be of metal since it is not in contact with the coffee.

In the operation of our improved coffee maker it may be assumed that the upper container 2 is separated from the lower container 1 and that the latter has been filled with water to a suitable level. It will be understood that the quantity of water will correspond approximately to that of the coffee that is desired to be made. The upper container with its sleeve 7 is then placed in sealing position on the lower container 1, as illustrated, and sufficient ground coffee is placed in the upper container 2 to make the beverage of the desired strength.

The lower container is then suitably heated, as by gas or electricity, as desired, and when the water contained therein reaches the boiling point steam will be formed which will collect above the surface of the water and the pressure in the lower container will gradually increase. As the boiling continues and the pressure increases water will be forced upwardly through the tube 3 and around the closure 4 into the upper container 2.

If the heating of the water is gradual, the strainer 4 will not be appreciably lifted, but if the heating is rapid, the strainer 4 may be lifted to permit the water to flow at a rate to correspond to that of the generation of steam pressure in the lower container 1. This flow continues until the level of the water in the lower container falls to the bottom of the tube 3.

The hot water which is now in the upper container 2 causes an infusion of the coffee therein. The liquid remains in the upper container so long as sufficient heat is applied to the bottom of the lower container to maintain the pressure required. In addition, continued boiling of the water in the lower container will force steam upwardly through tube 3 and which will escape to the atmosphere through the liquid in the upper container. This process may continue for any desired time but preferably not more than from three to five minutes. At the end of the desired period heating of the water in the container below is discontinued.

The steam above the surface of the water in the lower container gradually condenses as the temperature falls with a corresponding lowering of pressure therein, and when the steam is sufficiently condensed the vacuum thus produced causes the water in the upper container to be forced downwardly through the extremely narrow crevices between the closure member 4 and the walls of the upper container 2, whereby the liquid coffee flows through at a relatively slow rate and the sediment or grounds of the coffee are retained in the upper container because the extremely slight openings are not sufficient to permit them to flow past the closure member.

The downward flow continues until all of the liquid is transferred to the lower container whereupon the upper container may be removed. The liquid coffee which is now in the lower container may be served from the latter by using the handle 5 to lift or tilt the lower container, as desired.

The modification shown in Figs. 3 and 4 differs from the preferred form of our invention with respect to the means for controlling the flow of liquid between the upper and the lower containers. Similar reference numerals are employed to designate corresponding parts.

At the bottom of the upper container 18, there is provided a flat annular surface 19 upon which rests a glass disk 20 of inverted cup-shape that is provided with any suitable number of apertures 21. As best shown in Fig. 4 the disk 20 is provided at its outer edge with notches or indentations 22 that are adapted to cooperate with nibs 23 integral with the walls of the container 17 to provide a bayonet joint connection between these members for loosely retaining the disk in position.

In the operation of the modified form of our invention, the action of the liquid is much the same as that previously described for the apparatus of Figs. 1 and 2 except that water may flow through the apertures 21 as well as around the disk 20 in passing upward into the upper container. A filter or strainer of cloth or other suitable material may be employed with the disk to prevent the flow of sediment or grounds through the apertures 21 if the latter are of such size as to otherwise permit such flow. If however the apertures are very small a filter or strainer may not be necessary as the apertures themselves, together with the slight openings under the edges of the disk 20, will perform this function.

Inasmuch as all of the parts of the coffee maker with which the liquid coffee comes in contact are of glass which is inert to the chemical constituents of coffee, there can be no foreign taste such as that caused by contact of hot liquid coffee with metal surfaces. The operation of the coffee maker is extremely simple and entirely automatic when heat is applied thereto and is discontinued. The process is continued until certain desirable constituents of the coffee have been infused into the liquid and the beverage thus produced has the natural taste of coffee.

While the apparatus of the present invention has been described with particular reference to coffee, it is also peculiarly adapted to the making of tea since the liquid in the upper container is always below the boiling point. It is well known that in making tea boiling water should not be in contact with the tea leaves.

The apparatus is also adapted for making infusions of various kinds, such as chemical or pharmaceutical preparations, as will be readily understood.

These and various other advantages will be appreciated by those skilled in the art of manufacturing and operating coffee makers.

We claim:

1. Apparatus for making infusions of coffee, tea, or the like, comprising a lower container, an upper container having a tube extending into said lower container and having a substantially air-tight connection thereto at an upper portion thereof, and a valve member for said tube that is movable upwardly to permit liquid to flow therearound from the lower to the upper container and that in its lower position has a slightly imperfect fit with the inner surface of the inlet portion of said tube and operates as a strainer to permit liquid to flow relatively slowly therearound from the upper to the lower container while preventing the passage of sediment therewith, said tube being provided with inwardly extending projections or nibs for limiting the upward movement of said valve member.

2. An apparatus for making infusions of coffee, tea, or the like, comprising a lower container, an upper container having a tube extending into said lower container and having a substantially air-tight connection thereto at an upper portion thereof, and a valve member for said tube that is movable upwardly to permit liquid to flow therearound from the lower to the upper container and that in its lower position has a slightly imperfect fit with the inner surface of the inlet portion of said tube and operates as a strainer to permit liquid to flow relatively slowly therearound from the upper to the lower container, while preventing the passage of sediment therewith, said tube being provided with inwardly extending projections or nibs for limiting the upward movement of said valve member, and said valve member being provided with grooves for cooperating with said projections to constitute a bayonet joint connection to permit the removal and insertion of said valve member.

3. Apparatus for making infusions of coffee, tea, or the like, comprising an upper and a lower container, a tube extending into said lower container and connected to the upper container, and a gravity-seated valve member for controlling communication between said containers in accordance with the direction of flow of liquid therebetween, said valve member having a portion of dimensions larger than those of the bore of the tube for normally substantially closing the opening of said tube and having a portion projecting into said opening with a loose connection to said tube whereby said valve member has a limited path for vertical movements.

4. Apparatus for making infusions of coffee, tea, or the like, comprising an upper and a lower container, a tube extending into said lower container and connected to the upper container, and a gravity-seated valve member for controlling communication between said containers in accordance with the direction of flow of liquid therebetween, said valve member having a portion of dimensions larger than those of the bore of the tube for normally substantially closing the opening of said tube and having a portion projecting into said opening, said tube having integral therewith nibs for engaging the projecting portion to limit the vertical movement of said valve member and said projecting portion having grooved portions for registering with said nibs to permit removal of said valve member.

5. Apparatus for making infusions of coffee, tea, or the like, comprising a lower container and an upper container having a tube connected to and extending into said lower container, a gravity-seated valve member adjacent an upper portion of said tube having a limited upward movement to permit liquid to flow upwardly through said tube and operable in its lower position to permit downward flow at a relatively slow rate and to serve as a strainer by reason of the slight clearance between the valve member and the seat therefor, the upper container having integral therewith nibs or projections for limiting the vertical movements of said valve member and the latter having recessed portions for registering with said nibs for permitting removal of said valve member.

RAYMOND WM. KELL.
CHARLES D. BARTH.